United States Patent [19]

Pietraszak et al.

[11] Patent Number: 5,691,710
[45] Date of Patent: Nov. 25, 1997

[54] SELF LEARNING IR REMOTE CONTROL TRANSMITTER

[75] Inventors: Michael G. Pietraszak, Hoffman Estates; Carl W. Stacy, Elmwood Park, both of Ill.

[73] Assignee: Zenith Electronics Corporation, Glenview, Ill.

[21] Appl. No.: 969,896

[22] Filed: Nov. 2, 1992

[51] Int. Cl.⁶ ................................................. G08C 19/00
[52] U.S. Cl. ........................ 340/825.72; 359/142; 359/148
[58] Field of Search ..................... 340/825.61, 825.72; 359/142, 143, 144, 147, 148

[56] References Cited

U.S. PATENT DOCUMENTS

| | | | |
|---|---|---|---|
| 4,623,887 | 11/1986 | Welles, II | 340/825.69 |
| 4,626,848 | 12/1986 | Ehlers | 340/825.69 |
| 4,866,434 | 9/1989 | Keenan | 340/825.69 |
| 4,999,622 | 3/1991 | Amano et al. | 340/825.72 |
| 5,043,723 | 8/1991 | Araki et al. | 340/825.69 |
| 5,229,763 | 7/1993 | Nakamaru | 340/825.72 |

Primary Examiner—Michael Horabik
Assistant Examiner—Edward Merz

[57] ABSTRACT

A learning type IR function code transmitter includes a memory storing the IR function codes of a large variety of different brands of transmitters. The learning transmitter includes an IR receiver and a microprocessor for detecting IR function codes transmitted from a teaching transmitter. The memory is searched when an on/off IR function code is required from the teaching transmitter. If a match is found between the received IR function code and one of the stored IR function codes, and if a unique set of IR function codes corresponding to the identified brand of teaching transmitter IR function codes exists, the transmitter keyboard is configured to operate with the function codes that correspond to the teaching transmitter. Provision is made for teaching one or more certain IR function codes to selected keys of the learning transmitter where such certain IR function codes are not found in the memory.

4 Claims, 3 Drawing Sheets

5,691,710

SELF LEARNING IR REMOTE CONTROL TRANSMITTER

BACKGROUND OF THE INVENTION AND PRIOR ART

This invention relates generally to remote control devices and more particularly to so-called learning types of remote control devices that are used to transmit infrared (IR) signals or function codes. Infrared remote control transmitters for controlling various functions of television receivers, VCR's, cable decoders and auxiliary equipment have become very popular in recent years. The result is often that a user is confronted with a number of different transmitters for controlling various products from different manufacturers or sources. Most manufacturers provide common transmitters to control their specific devices by reconfiguring the transmitter keyboard with a switch or the like. Devices of different manufacturers, however, need to be controlled with separate remote control devices. In an effort to minimize the number of individual remote control devices a user must have, so-called learning remote control transmitters have been developed. These transmitters can learn (or be taught) in two ways. In one, the user identifies the brand (manufacturer) of the product for which he wants to configure the learning transmitter. This is usually done by looking up a table that lists the devices of various manufacturers. The listed code number corresponding to the desired brand of device is then keyed into the learning transmitter. Since a number of code numbers may be listed for a particular brand of product, the user must employ a trial and error approach. The other method requires that the IR function codes that are to be learned be made available from a teaching transmitter, which is most often the transmitter supplied with the particular product. Learning is accomplished by first positioning the teaching and learning transmitters such that the IR signals from the teaching transmitter are received by the learning transmitter. Then a program is followed which includes sequentially transmitting the IR function codes associated with the keys of the teaching transmitter to the learning transmitter. The learning transmitter stores the detected IR function codes in its memory and essentially reconfigures the keyboard of the learning transmitter so that the appropriate IR function codes may be transmitted.

The primary difficulty of the latter technique (aside from it being very time consuming) is the likelihood of error since a large number of steps is involved. The difficulty with the former technique is in the proliferation of the different IR function codes associated with the many brands of transmitter devices. This is compounded by the fact that many manufacturers supply products to large private label retailers. Thus a single retailer may have television receivers, for example, that are manufactured by a number of different manufacturers. Sorting through the different IR function codes for the various manufacturers of such private label receivers to find the correct code set is extremely frustrating and time consuming.

OBJECTS OF THE INVENTION

Accordingly, a principal object of the invention is to provide a novel learning type remote control transmitter.

Another object of the invention is to provide a learning type remote control transmitter that is simpler to operate and less prone to error in programming.

A further object of the invention is to provide a learning type remote control transmitter that minimizes operator effort in the teaching process.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
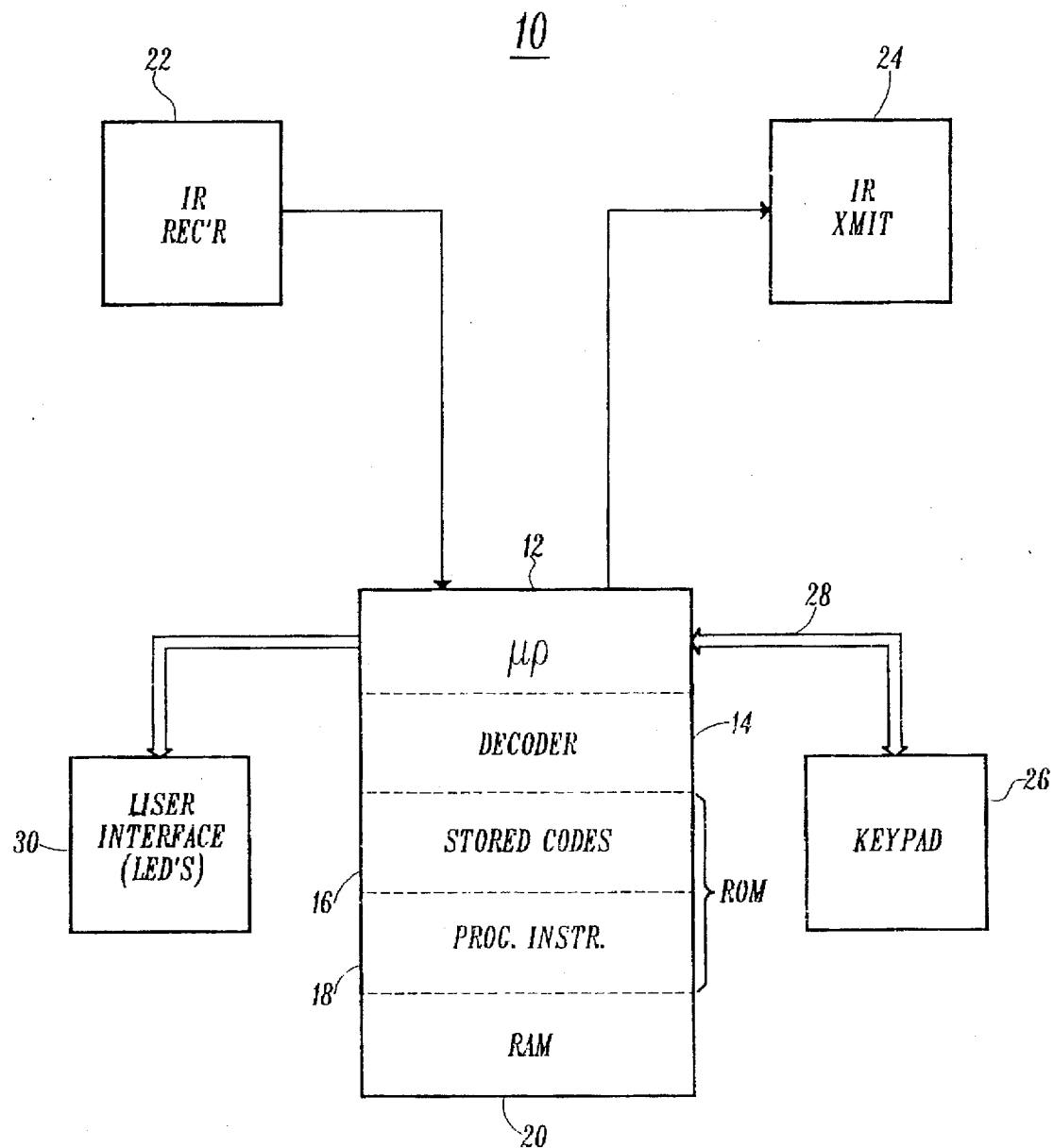
FIG. 1 is a simplified block diagram of the learning transmitter of the invention.

As shown in FIG. 1, a learning transmitter constructed in accordance with the invention is indicated generally by reference numeral 10. An integrated circuit chip comprises the heart of the transmitter and includes a microprocessor 12, a decoder arrangement 14, a plurality of stored IR function codes 16, a plurality of program instructions 18 and a RAM memory 20. The stored IR function codes and program instructions are generally part of a ROM memory. Microprocessor 12 is connected to an IR receiver 22 that receives externally transmitted IR function codes (from a teaching transmitter, not shown) and supplies them to microprocessor 12 where they are conventionally decoded by decoder 14. Microprocessor 12 is also coupled to an IR transmitter 24 that transmits IR function codes to products to be controlled (not shown) in response to key closures of a keypad 26, which is coupled over a bidirectional communications bus 28 to microprocessor 12. Keypad 26 is thus configured to control the transmission of appropriate IR function codes by IR transmitter 24 in response to appropriate key closures of keypad 26. Finally, a user interface 30 is coupled to microprocessor 12, which user interface provides to the user various message prompts and other information for assisting in the programming of the learning transmitter. Typically, the user interface consists of a plurality of light emitting diodes (LED's) that are illuminated in sequence to indicate various operating stages and to prompt desired user actions. The learning transmitter is generally accompanied by an instruction manual or booklet to guide the user in its operation. The manual lists various number codes corresponding to different products and brands of manufacture.

Since learning transmitters are now well known in the art, details of their operation will not be given. Suffice it to say that the learning transmitter has a memory that is organized into a plurality of pages with the various IR function codes for a particular brand being generally assigned to a specific memory page. Since the learning transmitter is generally capable of learning codes for television receivers, VCR's, cable converters and various auxiliary products, the memory capabilities are quite extensive. Indeed, the learning transmitter of the invention is capable of learning any of 50 different IR function codes for each of four product categories. Access to the various pages of memory is still made available by means of published codes (usually three digits) that identify the IR function codes by manufacturer or brand of television receiver, etc. However, in accordance with the invention, a function code, such as the on/off or power code, which every remote control transmitter generally includes, is used in conjunction with a learning software routine to greatly simplify teaching desired IR function codes to the learning transmitter.

Figure 2A:
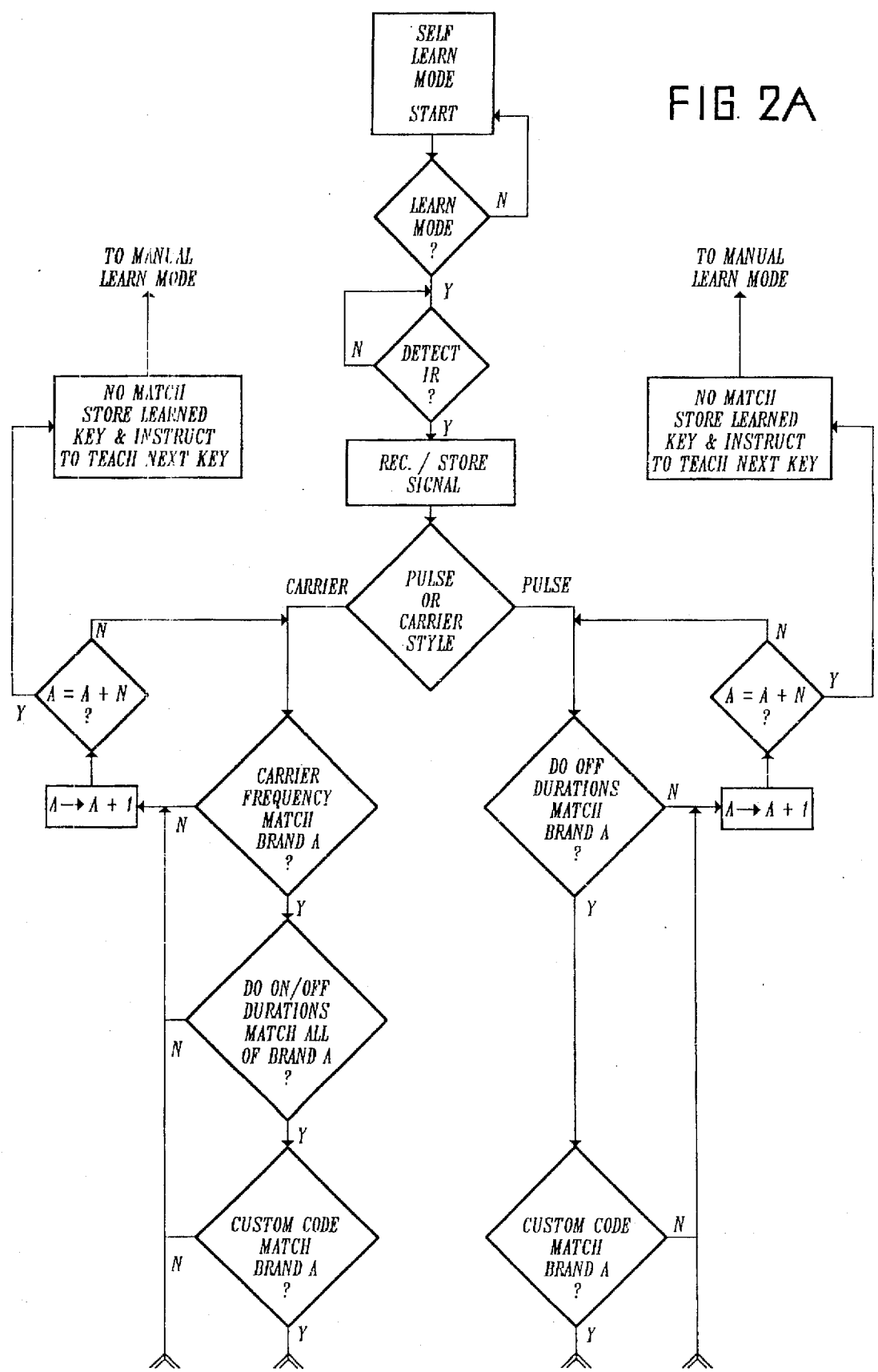
FIGS. 2A and 2B together comprise a flow chart illustrating the teaching of IR code functions to the learning transmitter of the invention.
Figure 2B:
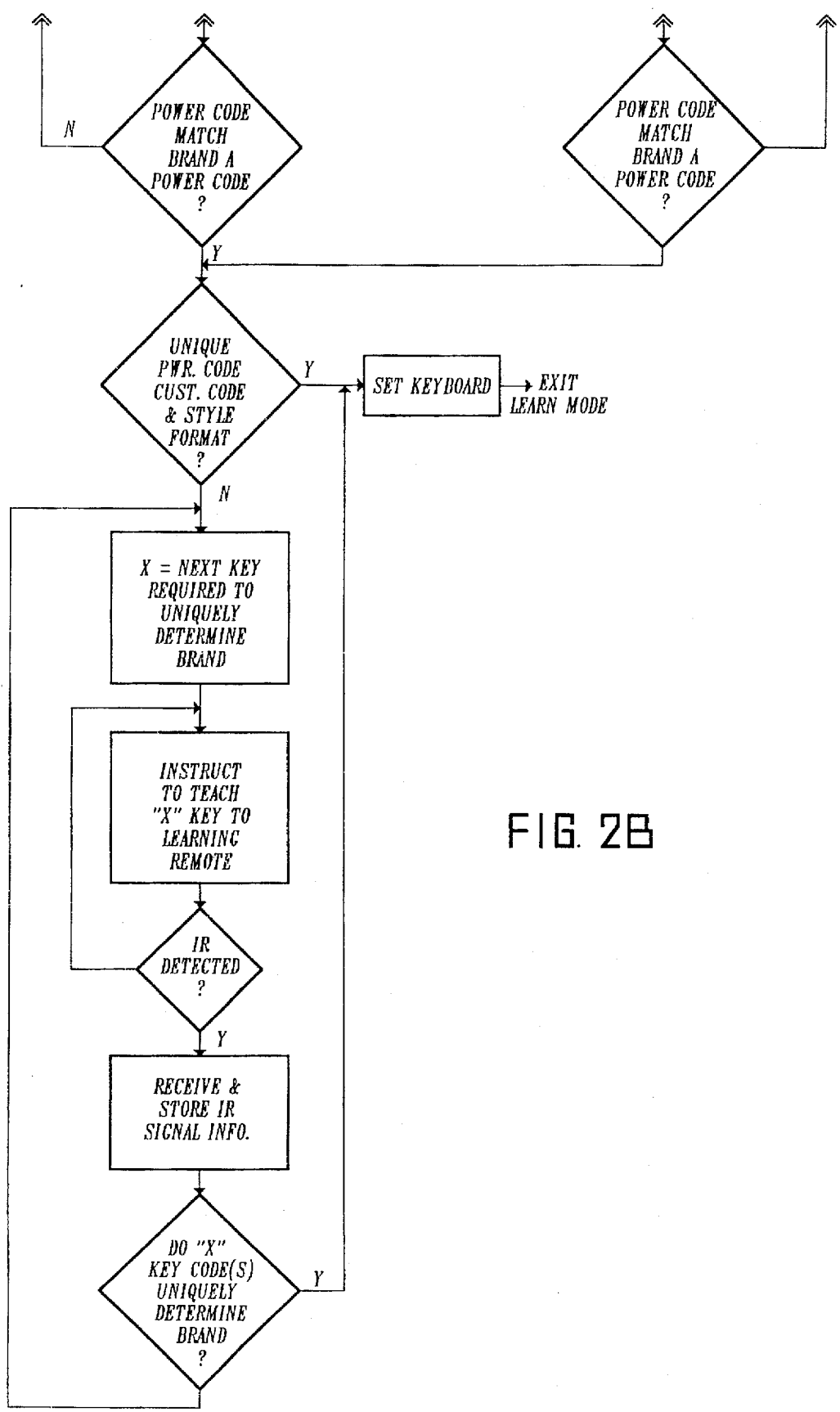

As mentioned briefly, an instruction book accompanies the learning transmitter and instructs the user to align the teaching and learning transmitters so that IR signals from the teaching transmitter will be received by the learning transmitter. In practice, the alignment is verified by illuminating an LED on the learning transmitter when a signal has been received. The flow chart in FIGS. 2A and 2B illustrate the learning sequence utilized in the invention.

At the start, the self-learn mode is selected for the learning transmitter and the teaching and learning transmitters are placed in alignment. The on/off or power button (key) of the teaching transmitter is depressed and the corresponding IR function code is received and detected by the learning transmitter. When the IR function code is detected, the signal is stored in the RAM memory of the learning transmitter. The signal is analyzed to determine its format or style, i.e. whether it is of the carrier or pulse type and depending upon that analysis, the flow chart diverges. If it is of the carrier type, the carrier frequency is searched through the memory to determine which brand of on/off IR code frequency is matched. The brands are indicated as brand A through brand A+N. If no stored on/off IR function code is matched by the received IR function code, the system instructs the user to return to the manual learn mode and to teach another key. This puts the system in the conventional teaching mode where each individual key of the teaching transmitter is taught to the learning transmitter. If a match is found with one of the brands in the memory, the on/off durations of the signals are compared. A match in this category leads to a search for a custom code matching, the custom code being a code portion or sequence imposed by a manufacturer on all of its remote control equipment for commonality. Assuming a custom code match is determined to exist, the on/off IR code itself is searched to see if it is indeed unique. If there is a unique power code, custom code and style (format) found, the keyboard of the learning transmitter is configured to utilize those IR function codes for transmitting and the learning mode is exited.

A similar path exists for pulse type signals. It differs from the carrier frequency path since no carrier frequency match determination is made. Rather the off durations are compared with those in memory followed by the search of the custom code and the power or on/off code. Again, if a unique set of IR function codes is found in the memory, that unique set is configured to operate with the keyboard of the learning transmitter. In most instances, this is the extent of the learning process since in all probability the exact set of IR function codes for the brand of the teaching transmitter will be found in the memory. Not only is the user's input minimal, but the probability of error is greatly reduced. Instead of having to "cut and try" through many numerical codes of different brands, the user merely depresses one key of the teaching transmitter and the search program of the learning transmitter does the rest.

In the event that there is no unique arrangement of power function code, custom code and format or style, the user is instructed to teach one or more of the keys that differ. These are identified as "X" function code keys. This situation obtains since some manufacturers may produce families of IR function codes that are identical with the exception of one or two keys. This is generally the mute key. In this instance, the user would be instructed by the LED interface to depress the appropriate X key or keys and this separate routine would be repeated until all of the different unique keys have been learned. The memory system is then loaded with the unique set of IR function codes for properly configuring the learning transmitter keyboard.

It will be recognized that there also may be sorted in the memory several IR function codes which are the same except for different codes for MUTE, RECALL and TIMER, for example. The transmitting of MUTE in this instance allows the learning transmitter to determine which set of function codes to configure to the keyboard.

What has been described is a novel arrangement for simplifying and minimizing error in teaching a learning transmitter the IR function codes of a teaching transmitter. It is recognized that numerous changes in the described embodiment of the invention will be apparent to those skilled in the art without departing from its true spirit and scope. The invention is to be limited only as defined in the claims.

What is claimed is:

1. A method of teaching a remote control device having a memory containing the IR function codes of a plurality of different IR signal transmitters, some of which have the same power on/off code, to transmit the IR function codes of one of said plurality of different signal transmitters comprising:

transmitting an on/off IR function code from said one signal transmitter to said remote control device;

receiving the transmitted on/off IR function code;

searching said memory for said received on/off IR function code to determine whether said received on/off IR function code is in said memory and if so;

sequentially checking said on/off IR function code to determine a unique match in said memory; and configuring the keyboard of said remote control device for transmitting other IR function codes in said memory corresponding to said one signal transmitter.

2. The method of claim 1 wherein said searching comprises temporarily storing said received on/off IR function code; and determining the format of said received on/off IR function code.

3. The method of claim 2 wherein said searching further comprises determining whether the on/off durations of said received on/off IR function code includes any custom IR code in said memory.

4. The method of claim 3 further comprising:

determining whether one or more IR function codes of said one signal transmitter are not in said memory; and instructing that the function code corresponding to one or more individual keys of said one signal transmitter be taught to said remote control device before said configuring.

* * * * *